Jan. 1, 1924
J. VRANA
GARMENT MEASURING DEVICE
Filed Aug. 6, 1921
1,479,119
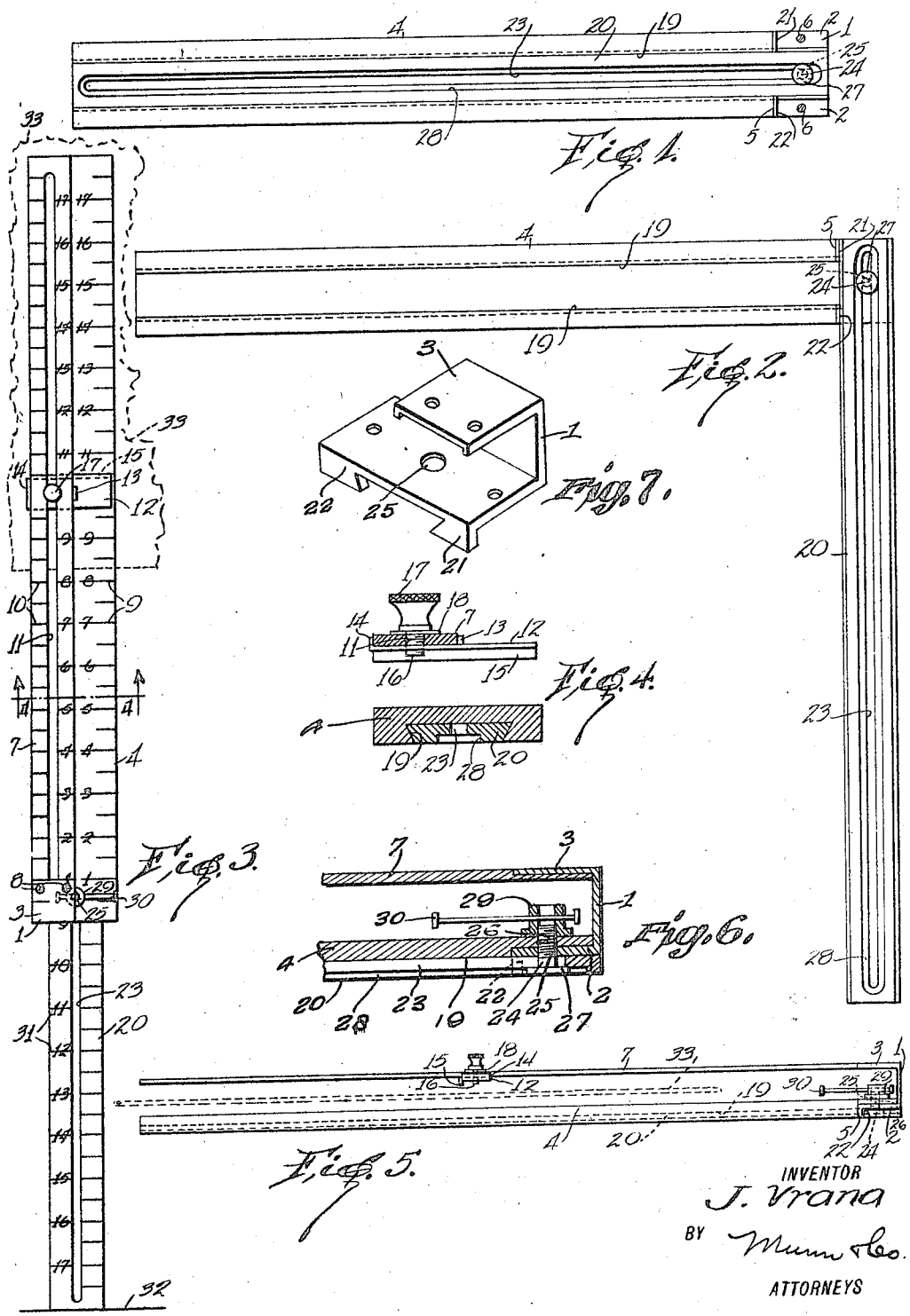

Patented Jan. 1, 1924.

1,479,119

UNITED STATES PATENT OFFICE.

JOHN VRANA, OF CICERO, ILLINOIS, ASSIGNOR OF ONE-HALF TO GEORGE B. EFANTIS, OF CICERO, ILLINOIS.

GARMENT-MEASURING DEVICE.

Application filed August 6, 1921. Serial No. 490,276.

*To all whom it may concern:*

Be it known that I, JOHN VRANA, a citizen of the United States, and a resident of Cicero, in the county of Cook and State of Illinois, have invented a new and useful Improvement in Garment-Measuring Devices, of which the following is a full, clear, and exact description.

My invention relates to measuring devices, and it consists in the combinations, constructions and arrangements herein described and claimed.

An object of my invention is to provide a device for measuring distances at different points from the lower edge of a garment, such as a skirt on a wearer, to a lower level surface, whereby the garment may be arranged to hang in a desired manner.

A further object of my invention is to provide a garment measuring device having means for indicating on a vertically hanging garment predetermined distances from a lower level surface.

A further object of my invention is to provide a device of the character described that combines in one article means for performing functions ordinarily requiring the use of a plurality of articles.

Other objects and advantages will appear in the following specification, and the novel features of the invention will be particularly pointed out in the appended claims.

My invention is illustrated in the accompanying drawings, forming part of this application, in which—

Figure 1 is a plan view of the device in folded condition and with the stock portion thereof uppermost, Figure 2 is a view similar to Figure 1, showing the measuring blade or extension embodied in the device arranged at right angles to the stock, Figure 3 is a view showing the device arranged in a desired position with respect to a portion of a garment, Figure 4 is a section through the device along the line 4—4 of Figure 3, Figure 5 is a side elevation of the device and Figures 6 and 7 are enlarged detail views of other portions of the device.

In carrying out my invention, I provide a U-shaped base member or holder 1 having vertically extending parallel arms 2 and 3. A stock 4 having the form of a bar has its outer face cut away at the lower end thereof, as at 5, to receive the arm 2. The stock 4 is rigidly secured to the arm 2 in any suitable manner, as by means of screws 6.

The arm 3 is bent laterally toward the arm 2 along its side edges to define a socket adapted to receive a measuring bar 7. The latter is fixedly attached to the arm 3 by means of screws 8, or the like, whereby it is normally parallel with the stock 4. It is to be observed that the measuring bar 7 has a length equal to that of the stock 4 and that its width and thickness are less, respectively, than the width and thickness of the stock 4, as best seen in Figure 3. The width of the arm 3 is likewise considerably less than the width of the arm 2 and in consequence substantially one-half of the stock 4 is exposed to view.

The exposed portion of the inner face of the stock 4 is provided with a scale embodying a series of graduation marks, indicated generally at 9. The unit of this scale is preferably one inch and the graduation marks 9 may be arranged to denote fractional parts of that unit. Certain of these graduation marks bear numbers indicating that the scale is to be read from a surface on which the base or holder 1 is placed toward the upper end of the stock.

The outer face of the measuring bar 7 is likewise provided with graduation marks 10 arranged to correspond in value and position with the graduation marks on the stock 4. The measuring bar 7 is fashioned with a longitudinally extending slot 11. An indicating member 12 is disposed transversely across the inner face of the measuring bar 7 to extend laterally of one edge thereof across the exposed portion of the inner face of the stock 4. The indicating member 12 is formed with guide lugs 13 and 14 arranged to straddle the measuring bar 7 and is also provided with a marking flange 15 that extends laterally of the upper edge thereof toward the inner face of the stock 4. An adjusting screw 16 is projected through the slot 11 from the outer face thereof into engagement with a threaded opening in the indicating member 12. The screw 16 is equipped with a knurled head 17 and a washer 18 may be interposed between the head 17 and the outer face of the measuring bar 7. It will thus be manifest that the indicating member 12 may be moved along the measuring bar 7 when the screw 16 is loosened and that the indicating member 12 will be maintained in adjusted position along the bar 7 when the screw 16 is tightened. The marking flange 15 has a straight edge relatively arranged with respect to the upper edge of the lug 14 so that the edge of the marking flange will coincide with the graduation mark on the inner face of the stock 4 which mark will be the same value as the graduation mark on the outer face of the measuring bar 7 indicated by the upper edge of the lug 14, when the measuring bar 7 is forced toward the stock 4. The base member or holder 1 is perferably formed of a metal having sufficient inherent resiliency to permit movement of the bar 7 toward the stock 4 under pressure.

The outer face of the stock 4 is provided with a dove-tail mortise 19 that extends from the cut away portion, indicated at 5, to the upper end thereof. A measuring blade or adjustable arm 20 is adapted to slidably fit the dove-tail mortise 19 and has a length substantially the same as that of the stock 4. The lower end portion of the extension 20 therefore overlies the outer face of the arm 2. Horizontally alined spaced apart lugs 21 and 22 extend laterally of the outer face of the arm 2 at right angles thereto and engage opposite side edges of the slidable extension 20. The latter is provided with a longitudinally extending slot 23. A guide pin 24 is projected through the slot 23 and through registering openings 25 and 26 in the arm 2 and the contiguous portion of the stock 4 to project beyond the inner face of the latter. The guide pin 24 is provided with a head 27 received in a groove 28 margining the guide slot 23, whereby the outer face of the head 27 and the outer face of the extension 20 are normally flush with the outer face of the stock 4. The portion of the screw 24 projecting beyond the inner face of the stock 4 is threaded for engagement with an adjusting and retaining nut 29. The latter may be manipulated in any suitable manner and may have a pin 30 projected transversely therethrough for convenience in manipulating the same. The extension 20 is provided with a scale having graduations, indicated generally at 31. The graduations 31 represent values correlated with the values of the graduations 9 and 10.

From the foregoing description of the various parts of the device, the operation thereof may be readily understood. The device is designed particularly for use in tailoring establishments and for household use. When determining distances from a lower level surface, such as indicated at 32, to desired points on a supported garment, a fragmentary portion of which is illustrated and denoted by the reference numeral 33, the device is placed in vertical position, as shown. When the distance to be measured is equal to or greater than the length of the stock 4, the arm 20 is extended and secured in a desired position, as shown. The indicating member 12 is then moved along the bar 7 until the upper edge of the lug 4 is alined with a selected graduation mark. The indicating member 12 is secured in adjusted position and the garment to be measured is then arranged between the inner faces of the bar 7 and the stock 4. Since the stock 4 is relatively inflexible, pressure against the outer face of the bar 7 will spring the latter toward the stock 4 and the fabric of the garment 33 will be clamped between the edge of the marking flange 15 and the stock 4 at a selected distance from the surface 32. This distance may be marked on the fabric in any suitable manner. The device may then be moved around the garment 33 to mark the garment at a number of points, all of the points being located at the same distance from the lower level surface 32. It will therefore be apparent that a garment, such as a skirt, may be arranged with the lower edge thereof positioned at the same distance from a level surface, such as a floor, at all points. The device may also be used for measuring distances from one edge of a garment to another at selected distances and in performing the operations for which rulers and like known measuring instruments are employed.

The arm 20 may be extended and arranged at a desired angle with respect to the stock 4. This angle may be a right angle, as illustrated in Figure 2, or an obtuse angle, whereby the device may be used selectively in performing the functions ordinarily requiring the employment of a square or a bevel. In order to swing the arm 20 with respect to the stock 4, the arm is first entirely withdrawn from the slot 19, or, in other words, until the screw 24 is received in the inner end of the slot 23. When the screw is disposed in the inner end of the slot 23, the arm 20 may be swung into any angle desired with respect to the stock, and be fastened in this position by means of the screw 24. When either of the edges of the arm 20 engages with the lugs 21 and 22, the operator instantly knows that the arm is at right angles to the stock 4.

I claim:

1. A device of the character described comprising a measuring bar, a second measuring bar of equal length and less width than the first-named measuring bar, said measuring bars being provided with correspondingly positioned similar scales thereon, means attached to each bar at an end thereof for normally maintaining said bars in spaced apart parallel relation, means adjustably supported on said second-named bar for indicating like values on the scales of the two bars simultaneously, and a bar-like extension slidably and rotatably supported on the first-named bar and movable at will into substantial alignment with the first-named bar or at various angular relations thereto, said extension being provided with a scale having indicia identical with those of said first-named scales.

2. In a device of the type described, a U-shaped member having spring arms, two measuring bars respectively carried by the arms of said member, a marking member carried by one of said bars and adapted to be brought into engagement with the other bar, and a third measuring bar slidably and rotatably supported by one of said measuring bars.

3. In a device of the type described, a U-shaped member having spring arms, two measuring bars respectively carried by the arms of said member, a marking member carried by one of said bars and adapted to be brought into engagement with the other bar, a set screw carried by said U-shaped member, and a third measuring bar slidably and rotatably supported by said set screw, said third-named measuring bar being movable at will into substantial alignment with the first-named bar.

4. In a device of the type described, a U-shaped member having spring arms, two measuring bars respectively carried by the arms of said member, a marking member carried by one of said bars and adapted to be brought into engagement with the other bar, a set screw carried by said U-shaped member, and a third measuring bar slidably and rotatably supported by said set screw, said third-named measuring bar being movable at will into substantial alignment with the first-named bar, and into various angular relations with respect to the first-named bar.

5. A device of the type described comprising a U-shaped member having spring arms, one of said arms having an outwardly turned metal edge, a measuring bar having a second measuring bar slidably and rotatably supported thereon, and being secured to the spring arm having the outwardly turned edge, a set screw carried by said U-shaped member and being adapted to secure said second-named bar in adjusted position, and a third measuring bar carried by the other spring arm, said second-named bar being movable at will into various angular relations to the first-named bar and being disposed at right angles to said first-named bar when the edge thereof abuts the metal edge of said spring arm.

JOHN VRANA.